Patented June 1, 1926.

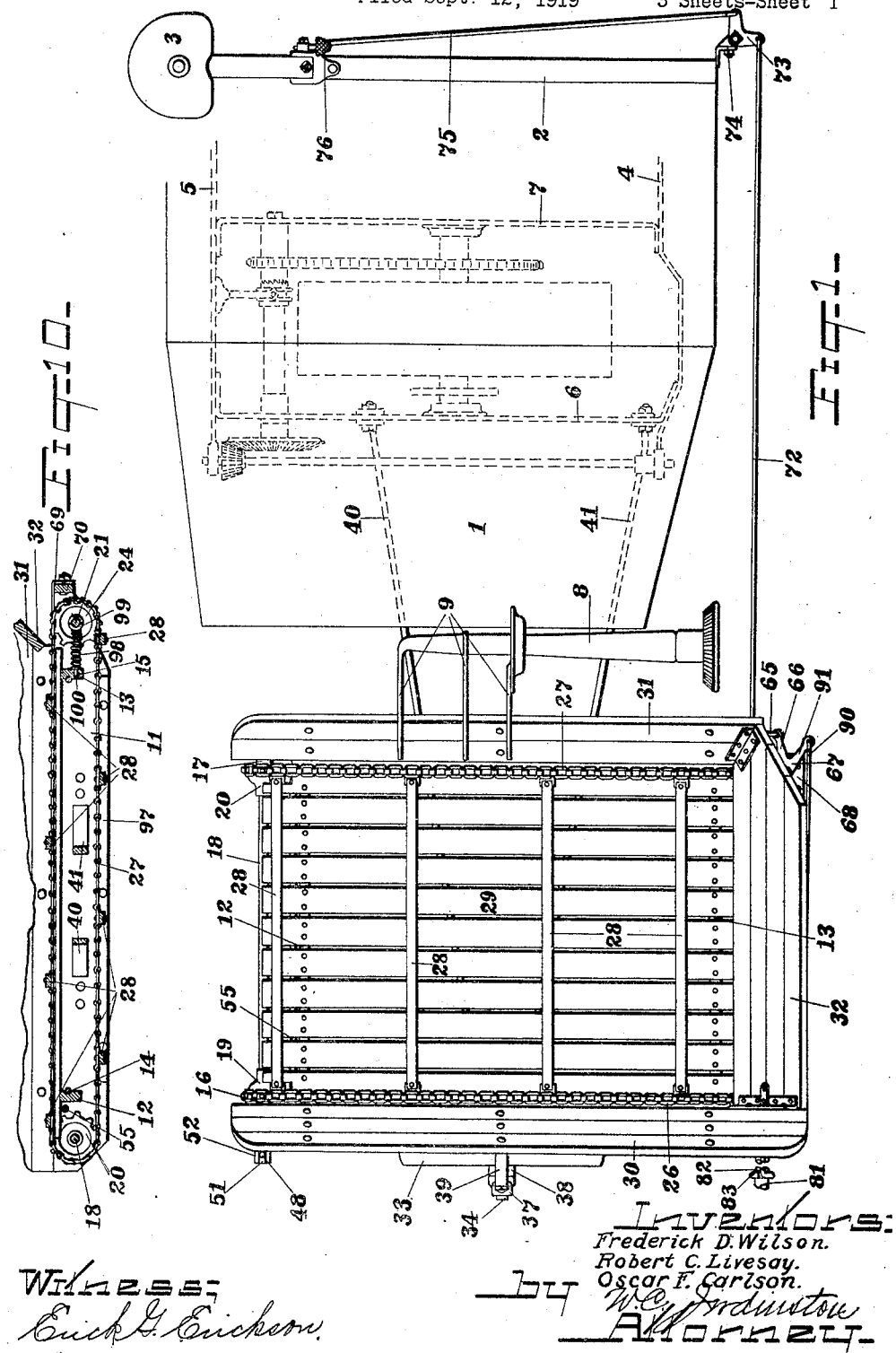

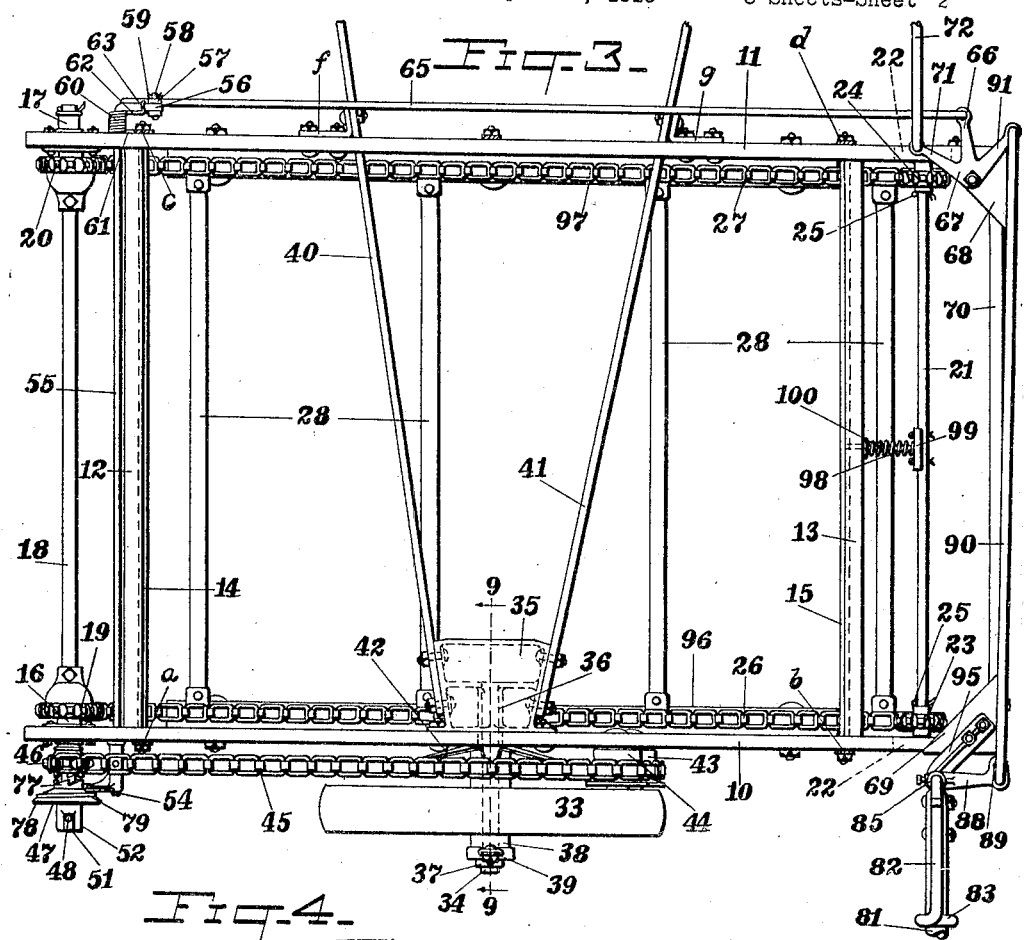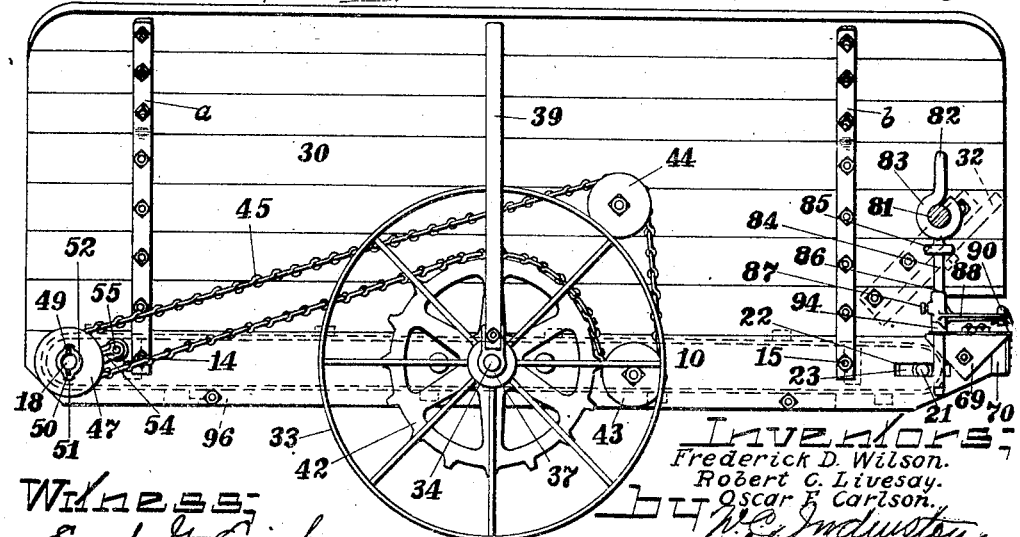

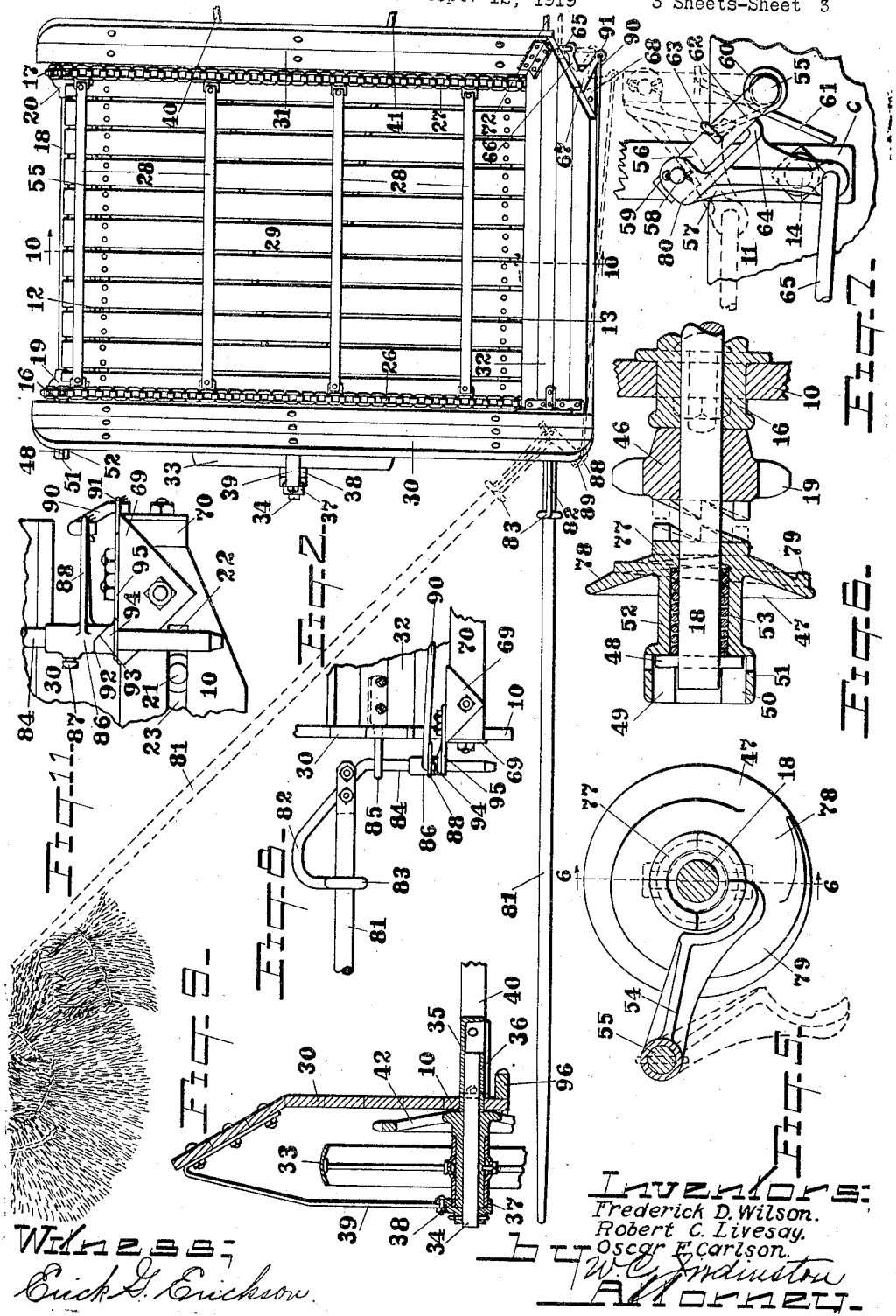

1,587,452

UNITED STATES PATENT OFFICE.

FREDERICK D. WILSON, ROBERT C. LIVESAY, AND OSCAR F. CARLSON, OF MOLINE, ILLINOIS, ASSIGNORS TO DEERE & COMPANY, OF MOLINE, ILLINOIS, A CORPORATION OF ILLINOIS.

BUNDLE CARRIER.

Application filed September 12, 1919. Serial No. 323,402.

Our invention relates to sheaf carriers of the conveyor type, adapted for attachment to a harvester and binder so as to receive the sheaves therefrom and deposit them on the ground, and the object of our invention is to provide a device of this class that is readily attachable to a harvester and binder or detachable therefrom, which derives its operating power from its supporting wheel and which is adapted to be tripped into operation manually or automatically. The carrier-supporting wheel referred to is additional to the supporting means of the harvester and binder, and is or may be located at the stubbleward side of the carrier (which arrangement is illustrated) or at another suitable point.

Referring to the drawings in which similar numerals indicate identical parts—

Figure 1 is a plan view of our improved carrier and as much of a harvester and binder necessary to illustrate the location of our device with relation to the delivery end of a harvester, and showing also in dotted lines the manner of attaching our device to a harvester frame.

Figure 2 is a plan view of the carrier and the automatic tripping arm.

Figure 3 is a plan view of the carrier with the receiving table, and the upper portion of the conveyor and the flaring side boards removed.

Figure 4 is a stubbleward side elevation.

Figure 5 is an enlarged end elevation of the clutch.

Figure 6 is an enlarged detail section on the line 6—6 of Figure 5.

Figures 7 and 8 are enlarged end views of parts of the tripping mechanism.

Figure 9 is an integral section on line 9—9 of Figure 3.

Figure 10 is a section on the line 10—10 of Figure 2, and

Figure 11 is an enlarged detail of part of the automatic tripping device.

So much of the harvester and binder as is shown includes the binder deck 1, the seat supporting bar 2 and the seat 3 mounted thereon. Part of the harvester frame is shown in dotted lines including a front bar 4, a rear bar 5, and cross bars 6 and 7. A binder arm 8 and ejector arms 9 are shown to illustrate the location of the carrier with relation to the binding and discharge mechanism.

The carrier frame side bars 10 and 11 are connected by transverse bars 12 and 13 and rods 14 and 15. Mounted in bearings 16 and 17, on the side bars 10 and 11 respectively is a shaft 18 having secured thereon sprockets 19 and 20, and a similar shaft 21 is carried by the opposite end of the frame, having its ends supported in slots 22 in the side bars 10 and 11. Sprockets 23 and 23 are loosely mounted on the shaft 21, and prevented from lateral movement thereon by pins or cotters 25. Chains 26 and 27 are operated by the sprockets, and are connected by transverse bars 28 which are secured to the chains and compose that element in the carrier called the conveyor by which the sheaves are carried to delivery on the ground.

A receiving table 29, preferably formed of slats, is rigidly supported on the bars 12 and 13 and receives and holds the sheaves until the carrier is operated to remove them therefrom. Sides 30 and 31 are secured to the frame bars 10 and 11 and extend vertically and are then flared outwardly to form a receptacle to accommodate a number of sheaves. Vertical bars $a$ and $b$ are bolted to the frame bar 10 and the side 30, and similar bars $c$ and $d$ are bolted to the frame bar 11 and the side 31 ensuring a rigid and enduring structure. A front board 32 connects the sides 30 and 31, and with the latter and the table 29, forms a receptacle for a number of sheaves which is open at the rear for proper ejectment of the bundles.

The carrier is supported in the following manner; a supporting and power wheel 33 is journaled on a stub shaft 34 secured in a casting 35 having a tubular portion 36 which extends through the frame bar 10 and in which the stub shaft 34 is secured. The outer end of the stub shaft 34 is supported in a collar 37 which is counterbored to fit over the adjacent end of the hub 38 of the wheel 33 and has secured to it a supporting brace 39 which extends upwardly to the flared portion of the side 30 to which it is rigidly bolted. The casting 35 is bolted to the frame bar 10 and broadens toward the frame bar 11; supporting bars 40 and 41 are bolted to opposite sides of the casting 35 and extend divergingly toward the frame bar 11, through which they pass, through suitable openings, and are secured to the cross bar 6 of the harvester frame, as shown in dotted lines in Figure 1. An angle brace *f* is bolted to the bar 40 and the frame side bar 11, and a similar brace *g* is bolted to the bar 41 and the frame side bar 11, holding both bars in place, and rigidly as to forward and backward movement; but it will be understood that the carrier wheel 33, being a power wheel to actuate the conveyor of the bundle carrier at desired times, is to remain in contact with the ground with the weight of the carrier superimposed thereon, to which end the connections of the carrier frame with the harvester frame are such as to allow the former to have upward and downward movement relative to the harvester and binder frame. Preferably these connections are in the nature of hinges of known construction and operation which relieve the bars 40, 41 of undue vertical bending or strain.

Power to actuate the chains 26 and 27 and the transverse bars 28 is derived from the traction power of the wheel 33 and is conveyed through a sprocket 42 which is rigidly secured to the hub of the wheel 33 in any suitable manner. An idler pulley 43 is mounted on the frame bar 10, adjacent the sprocket 42 and a similar idler pulley 44 is mounted above on the side 30; a sprocket chain 45 is in continuous engagement with a portion of the sprocket 42 and passes under the idler pulley 43 and upwardly and over the idler pulley 44 to a sprocket 46 loosely mounted on the shaft 18. The sprocket 46 is one part of an ordinary claw clutch the second part 47 of which is keyed to slide on the shaft 18; the key 48 passes through the shaft 18 and engages with opposite grooves 49 and 50 in an enlarged part 51 of the hub 52 of the second part of the clutch. The hub 52 for a part of its length has its internal diameter greater than the diameter of the shaft 18 for reception of a coiled spring 53 which surrounds the shaft 18 and exerts its tension, between the key 48 and the forward inner wall of the hub 52, to force the parts of the clutch into engagement so that the traction power of the wheel 33 will be transmitted to the chains 26 and 27 and the bars 28 to deposit on the ground any sheaves accumulated on the table 29.

Normally, or while accumulating bundles on the table 29, the parts of the clutch are held separated by an arm 54 rigidly mounted on the end of a rod 55, which extends transversely of the carrier frame and through suitable apertures in the side bars 10 and 11; the grainward end 56 of the rod 55 is bent at substantially a right angle and extends upwardly and forwardly and has its end pivotally secured in the bifurcated upper end of a lever 57, by a bolt 58 which extends through both bifurcations and the end of the portion 56 of the rod 55, a cotter 59 holds the bolt 58 against displacement. A coiled spring 60, on the rod 55, is interposed between the bend thereof and the frame bar 11; one end portion 61 of said spring is straightened and is in a tension contact with a side of the bar *e*, and the remaining end portion 62 of the spring 60 is also straightened and its termination formed into a hook 63 which clasps the bent end 56 of the rod 55; the rear side of the lever 57 is projected to form a stop 64 against which the bent end of the rod 55 is normally held in contact by the spring 60.

A rod 65 is pivotally connected to the lower end of the lever 57 and extends forwardly to pivotal connection with the central arm 66 of a trident 67 which is pivotally mounted on a support 68, the latter being a metallic corner brace which is employed, together with a similar brace 69, to secure the frame bars 10 and 11 to a front frame bar 70. To the rearward arm 71 of the trident 67 is pivotally connected a rod 72 which extends to pivotal connection with one arm of a bell crank 73 pivotally mounted on a bracket 74 secured on the forward end of the seat bar 2 of the harvester. A rod 75 connects the other arm of the bell crank 73 to a treadle 76 suitably mounted on the seat bar 2 convenient to the seat 3.

As before stated the clutch is held inoperative by an arm 54 rigidly secured on the shaft 18, and while so employed the free end of the arm 54 rests on the periphery of a part 77 of the clutch part 47; from the periphery of part 77 a conical surface 78 of the part 47 is presented and has on its face a spiral cam 79. Now when the treadle 76 is actuated by the foot of the driver the bell crank 73 and the trident 67 are rocked and, through the rod 65, the lever 57 is rocked on its pivot 58 until a shoulder 80 contacts with the part 56 of the rod 55; continuation of the pull of the rod 65 turns the rod 55 rearwardly and swings the arm 54 downwardly, and the pressure of the spring 53 causes an engagement of the two parts of the clutch so that the traction power of the supporting wheel 33 is at once exerted to move the conveyor, the chains 26 and 27 and the bars 28, and discharge rearwardly any bundles upon the table 29. When the treadle 76 is released, the action of the coiled spring 60 is to restore the parts to their inoperative position, the arm 54 rocking upwardly into contact with the spiral cam 79 which operating against the arm 54 forces the part 47 of the clutch out of engagement with the clutch teeth on the sprocket 46, and as the latter is loose upon the shaft 18 the traction power of the supporting wheel 33 is cut off from the conveyor until it is again desired to operate it.

To automatically operate the conveyor to empty the carrier we provide a finger 81 preferably tapered, which is mounted on a support 82, and through an eye 83, formed on the latter, the grainward end of the finger extends and is slotted to receive an inclined portion of the support 82 to which it is secured by suitable bolts; a vertical part 84 is pivotally held in an eye 85, and the lower portion of the part 84 is held rigidly in a sleeve 86 by a set screw 87. An arm 88 extends forwardly from the sleeve 86 and has a transverse slot 89 in which is inserted the bent end of a rod 90. The rod 90 is held in engagement with the slot 89 by a pin or cotter, and extends substantially parallel with the front of the carrier to connection with the remaining arm 91 of the trident 67.

The normal position of the finger 81 is substantially parallel with the front of the carrier and it is so held by the lower end of the sleeve 86 having a part 92 of its diametrical surface flat, and the remainder a downward bevel 93 to register with a similar conformation of the upper end of a bearing 94 integral with a bracket 95 rigidly bolted to the corner brace 69. The vertical portion 84 of the support 82 is rotatably supported in the bearing 94 from which it is readily removable, for by loosening the set screw 87 the support 82 and the finger 81 can be detached from the carrier, and the sleeve 86, with attached arm 88 and the rod 90, is also removable, leaving the header and connected parts as the sole means for tripping into operation the parts heretofore described for removing the sheaves from the carrier.

When the finger 81 and connected parts are mounted on the carrier for the purpose of automatically tripping the conveyor into action, the finger 81 is adapted to contact with a shock made of sheaves of the previous cutting, and, as the machine advances, the free end of the finger 81 is held by the shock, causing the finger, and its support 82, to rock in its bearings on the carrier; this movement swings the arm 88 grainward, creating a pull on the rod to rock the trident 67 so that the clutch is operated in the same way as described when the treadle is used. When the finger 81 is released from contact with a shock it is swung again into normal position by reason of the force exerted by the spring 60. The device employed for retaining the finger 81 in its normal position, as shown in full lines in Figure 2, is well known in the mechanical art, so that it is obvious that the sleeve 86 will rise, as it turns, because of the beveled end acting upon the bevel of the bearing 94, and that the same bevels will assist in returning the finger 81 to its position of readiness. If, in the operation of the automatic device, the finger 81 should contact with a single sheaf, sufficient lost motion is provided by the slot 89 in the arm 88 and the space between the shoulder 80 and the part 56 of the rod 55, to permit the finger 81 to swing rearward without tripping the conveying mechanism into operation.

The conveyor, formed of the chains 26 and 27 and the bars 28 therewith connected, when in operation passes over the table 29, and to prevent sagging of the conveyor beneath the table, guide bars 96 and 97 are provided attached to the inner sides of the bars 10 and 11 respectively and on which the chains rest and travel; any possible slack of the chains 26 and 27 is prevented by a coiled spring 98. A casting 99 is secured on the shaft 21 and supports a short rod 100 which extends through the spring 98 and rest in a suitable opening in the bar 13. As the spring is slightly compressed between the casting 99 and the bar 13 its expansive force is exerted to press the shaft 21 and sprockets 23 and 24 forwardly, the ends of the shaft 21 moving in the slots 22 in which the shaft 21 is supported, consequently a constant adjustment of the conveyor chains is automatically maintained.

It will be understood that by our improvement the main harvester or bull wheel is relieved of any bundle-discharging function, and costly driving connections are dispensed with between the harvester mechanism and the movable bundle-discharging means of the carrier. Also the entire conveyor-actuating means partakes directly of any upward and downward movement of the sheaf-carrier.

What we claim is—

1. The combination with a harvester and binder, of a sheaf carrier secured to the harvester and adapted to receive sheaves from the binder, a supporting wheel for the carrier at the stubble side of the carrier, and means actuated at will to discharge sheaves from the carrier by the traction power of the said supporting wheel.

2. The combination with a harvester and binder, of a sheaf carrier secured to the harvester, a supporting wheel for the carrier which wheel is additional to the supporting means of the harvester and binder, a table in the carrier to receive sheaves from the binder, and means actuable at will to discharge sheaves from the carrier by the traction power of the said supporting wheel.

3. The combination with a harvester and binder, of a sheaf carrier secured to the harvester and binder and adapted to receive sheaves from the binder, a supporting wheel for the carrier which wheel is additional to the supporting means of the harvester and binder, and an endless conveyor operable at will to discharge sheaves from the carrier by the traction power of the said supporting wheel.

4. The combination with a harvester and binder, of a sheaf carrier secured to the harvester and binder, a supporting wheel for the carrier which wheel is additional to the supporting means of the harvester and binder, a table in the carrier adapted to receive sheaves from the binder, and an endless conveyor operable at will by the traction power of the said supporting wheel to discharge sheaves from the carrier.

5. The combination with a harvester and binder, of a sheaf carrier secured to the harvester, a supporting wheel for the carrier which wheel is additional to the supporting means of the harvester and binder, said carrier including a receptacle adapted to receive sheaves from the binder, a table forming the bottom of the receptacle, and an endless conveyor operable at will to discharge sheaves from the carrier and actuated by the traction power of the said supporting wheel.

6. The combination with a harvester and binder, of a sheaf carrier secured to the harvester and adapted to receive sheaves from the binder, a supporting wheel for the carrier which wheel is additional to the supporting means of the harvester and binder, a conveyor operable to discharge sheaves from the carrier, mechanism interposed between the wheel and the conveyor and operative by the traction power of the said wheel to actuate the conveyor, and means operative at will to connect said mechanism with the conveyor.

7. The combination with a harvester and binder, of a sheaf carrier secured to the harvester and adapted to receive sheaves from the binder, a supporting wheel for the carrier which wheel is additional to the supporting means of the harvester and binder, a conveyor operable to discharge sheaves from the carrier, mechanism including a clutch interposed between the said supporting wheel and the conveyor to operate the conveyor by the traction power of the supporting wheel, means to hold the clutch open, and means operable at will to close said clutch to actuate the conveyor by the traction power of the supporting wheel.

8. The combination with a harvester and binder of a sheaf carrier secured to the harvester and adapted to receive sheaves from the binder, a supporting wheel for the carrier which wheel is additional to the supporting means of the harvester and binder, and means operable to discharge sheaves from the carrier by the traction power of the said supporting wheel.

9. The combination with a harvester and binder, of a sheaf carrier secured to the harvester, a supporting wheel for the carrier which wheel is additional to the supporting means of the harvester and binder, a table in the carrier to receive sheaves from the binder, and means actuable to discharge sheaves from the carrier by the traction power of the said supporting wheel.

10. The combination with a harvester and binder, of a sheaf carrier secured to the harvester and binder and adapted to receive sheaves from the binder, a supporting wheel for the carrier which wheel is additional to the supporting means of the harvester and binder, and an endless conveyor operable to discharge sheaves from the carrier by the traction power of the said supporting wheel.

11. The combination with a harvester and binder, of a sheaf carrier secured to the harvester and binder, a supporting wheel for the carrier which wheel is additional to the supporting means of the harvester and binder, a table in the carrier adapted to receive sheaves from the binder, and an endless conveyor operable to discharge sheaves from the carrier by the traction power of the said supporting wheel.

12. The combination with a harvester and binder, of a sheaf carrier secured to the harvester, a supporting wheel for the carrier which wheel is additional to the supporting means of the harvester and binder, said carrier including a receptacle adapted to receive sheaves from the binder, a table forming the bottom of the receptacle, and an endless conveyor operable to discharge sheaves from the carrier by the traction power of the said supporting wheel.

13. The combination with a harvester and binder, of a sheaf carrier secured to the harvester and adapted to receive sheaves from the binder, a supporting wheel for the carrier which wheel is additional to the supporting means of the harvester and binder, a conveyor operable to discharge sheaves from the carrier, mechanism interposed between the wheel and the conveyor and operative by the traction power of the said wheel to actuate the conveyor, a finger pivotally mounted on the carrier to swing rearwardly, means connecting the finger with said mechanism, whereby said mechanism is actuated by the rearward swing of the finger to operate the conveyor by the traction power of the supporting wheel.

14. The combination with a harvester and binder, of a sheaf carrier secured to the harvester and adapted to receive sheaves from the binder, a supporting wheel for the carrier which wheel is additional to the supporting means of the harvester and binder, a conveyor operable to discharge sheaves from the carrier, mechanism including a clutch interposed between the supporting wheel and the conveyor to operate the conveyor by the traction power of the said supporting wheel, means to hold the clutch open, a finger pivotally mounted on the carrier to swing rearwardly, and means connecting said finger with the clutch whereby the latter will close as the finger swings rearwardly.

15. A grain binder attachment comprising a portable frame, an endless conveyor thereon, a ground and power wheel supporting said frame independently of the binder, means for connecting said frame to the binder, whereby said frame can have upward and downward movement relative to the binder, and means including an obstacle actuated controlling element for operatively connecting said wheel and conveyor intermittently.

FREDERICK D. WILSON.
ROBERT C. LIVESAY.
OSCAR F. CARLSON.